United States Patent [19]

Schewe

[11] Patent Number: 4,672,493
[45] Date of Patent: Jun. 9, 1987

[54] THIN-FILM MAGNETIC HEAD WITH A DOUBLE GAP FOR A RECORDING MEDIUM TO BE MAGNETIZED VERTICALLY

[75] Inventor: Herbert Schewe, Herzogenaurach, Fed. Rep. of Germany

[73] Assignee: Siemens Aktiengesellschaft, Berlin and Munich, Fed. Rep. of Germany

[21] Appl. No.: 727,220

[22] Filed: Apr. 25, 1985

[30] Foreign Application Priority Data

May 4, 1984 [DE] Fed. Rep. of Germany ....... 3416544
Jan. 21, 1985 [DE] Fed. Rep. of Germany ....... 3501810

[51] Int. Cl.$^4$ ..................... G11B 5/187; G11B 5/127
[52] U.S. Cl. .................................... 360/125; 360/122
[58] Field of Search ............... 360/125, 110, 113, 119, 360/121–123, 126–127

[56] References Cited

U.S. PATENT DOCUMENTS 3,394,361 7/1968 Hahs .................................. 360/125
4,287,544 9/1981 Lazzari .............................. 360/131

FOREIGN PATENT DOCUMENTS 0012910 7/1980 European Pat. Off. .
0012912 7/1980 European Pat. Off. .
0078374 5/1983 European Pat. Off. .
0088812 5/1983 Japan .

OTHER PUBLICATIONS

Valstyn, "Composite Read/Write Recording Head", IBM TDB, Sep. 1971, vol. 14, No. 4, pp. 1283–1284.
Hoagland, "Combined Longitudinal and Vertical Magnetic Recording Head", IBM TDB, Jan. 1978, vol. 20, No. 8, pp. 3311–3312.
IEEE Transactions on Magnetics: vol. MAG-16, No. 1, Jan. 1980, pp. 71–76, vol. MAG-17, No. 6, Nov. 1981, pp. 3120–3122, vol. MAG-18, No. 6, Nov. 1982, pp. 1158–1163.
Feinwerktechnik & Messtechnik, vol. 88, No. 2, Mar. 1980, pp. 53–59, Siemens-Zeitschrift, vol. 52, No. 7, 1978, pp. 434–437.

*Primary Examiner*—Stuart N. Hecker
*Assistant Examiner*—David J. Severin
*Attorney, Agent, or Firm*—Kenyon & Kenyon

[57] ABSTRACT

A thin-film magnetic head with a layer-wise build-up on a nonmagnetic substrate for a recording medium which can be magnetized vertically comprises a magnetic conduction body carrying the magnetic flux, with two outer magnet legs and a further central magnet leg, the poles of which facing the recording medium are arranged one behind the other as seen in the direction of motion of the head, and with predetermined gap widths between each other, where the current conductors of a write/read coil arrangement extend through spaces formed between the central magnet leg and a respective outer magnet leg adjacent thereto. With this magnetic head it is possible to generate a magnetic writing field, the field pattern of which has a pronounced largely symmetrical maximum. It is provided that the current conductors of the coil arrangement also run through a further space where the current flow directions in the current conductors arranged on both sides of the central magnet leg are opposed to each other. It is particularly advantageous if the central magnet leg has, at least in the vicinity of the pole, a higher saturation magnetization than the outer magnet legs, so that these magnet legs are in magnetic saturation sooner than the central leg during writing.

17 Claims, 5 Drawing Figures

THIN-FILM MAGNETIC HEAD WITH A DOUBLE GAP FOR A RECORDING MEDIUM TO BE MAGNETIZED VERTICALLY

BACKGROUND OF THE INVENTION

The present invention relates to a thin-film magnetic head with a layer-wise build-up on a nonmagnetic substrate for a recording medium which contains a magnetizable storage layer, into which information can be written along a track by perpendicular (vertical) magnetization. The magnetic head comprises a magnetic conducting body for carrying the magnetic flux, with two outer magnet legs and a further central magnet leg, wherein the poles of these magnet legs facing the recording medium, as seen in the direction of motion of the head, are arranged one behind the other and with predetermined gap widths between each other. The magnetic head is further provided with a read/write coil device, the current conductors of which extend through one of the spaces formed between the central magnet leg and one each of the adjacent outer magnet legs. Such a magnet head is known, for instance, from European Patent application No. 0 078 374 Al.

The principle of vertical magnetization for storing information in special recording media is generally known (see, for instance, "IEEE Transactions on Magnetics", vol. MAG-16, No. 1, January 1980, pages 71 to 76; DE-OS No. 29 24 013 or U.S. Pat. No. 4,278,544; European Patent Application No. 0 012 910 Al; European Patent Application No. 0 012 912 Al. The recording media to be provided for this principle, also called vertical magnetization, may be present in the form of rigid magnetic discs, flexible individual discs (floppy discs) or magnetic tape. Such a recording medium has at least one magnetizable storage layer of predetermined thickness which contains a magnetically anisotropic material, particularly of a CoCr alloy. The axis of the so-called easy magnetization of this layer is oriented perpendicularly to the surface of the medium. By means of a special magnetic head, the individual pieces of information can then be written along a track as bits in successive sections, also called cells or blocks, by appropriate magnetization of the storage layer. In practice, the magnetic flux changes, i.e., the transitions from one magnetization direction to the opposite one are generally used as the information. The bits have a predetermined extent, also designated as the wavelength, in the longitudinal direction of the track. This extent can be substantially smaller than the limit which exists with storage according to the known principle of longitudinal (horizontal) magnetization by the demagnetization. Thus, the information density in the special recording media can be increased accordingly by vertical magnetization.

The combined magnetic write and read heads known for the principle of longitudinal magnetization, i.e., heads with which the write as well as the read function can be carried out, cannot be used without problem for vertical magnetization. When using these heads, which generally have a shape similar to a ring head, although a magnetic flux conduction also desired with the principle of vertical magnetization to form a circuit closed as far as possible with low magnetic resistance can be achieved, it is difficult to generate a sufficiently strong writing field for high bit densities and a correspondingly small width of the so-called air gap formed between the magnetic poles.

One is therefore compelled to develop special magnetic write/read heads for the principle of vertical magnetization. A head suitable therefore comprises, in general, a so-called main pole, by which a sufficiently strong vertical magnetic field for changing the magnetization of the individual sections of the storage layer is generated. The necessary magnetic return can then be realized, for instance, by means of a so-called auxiliary pole which is located, as far as the recording medium is concerned, for instance, on the same side as the main pole (see, for instance, "IEEE Trans. Magn." vol. MAG-17, No. 6, November 1981, pages 3120 to 3122 or vol. MAG-18, no. 6, November 1982, pages 1158 to 1163; U.S. Pat. No. 4,287,544; European Patent application No. 0 012 912 Al).

In magnetic heads of this head type, the auxiliary pole is to serve in all cases only for the return of the magnetic flux. A possible concurrent writing of this pole may possibly be tolerated because it is always lagging the writing main pole and thereby overwrites information which may have been written by the auxiliary pole. However, in order to suppress concurrent reading of the auxiliary pole with its trailing edge at least to a large extent, the air gap formed between the two poles would have to be relatively wide in order to be able to thus ensure a far-reaching reduction of the magnetic flux density at the auxiliary pole. Gap layers of such width, however, can be realized in magnetic heads to be built-up by a thin-film technique only with difficulty.

This technique is generally known (see, for instance, "Feinwerktechnik und Messtechnik", vol. 88, No. 2, March 1980, pages 53 to 59, or "Siemens-Zeitschrift", vol. 52, No. 7, 1978, pages 434 to 437). The magnetic head shown in European Patent Application No. 0 078 374 Al mentioned at the outset also is to be manufactured by this technique.

Due to the difficulties arising with respect to concurrent reading of the auxiliary pole, the magnetic head known from European Patent Application No. 0 078 374 Al has not only two magnet legs forming a main and an auxiliary pole, but also a third, central magnet leg which is arranged between the two outer magnet legs. The ends of these, therefore, three magnet legs which face the recording medium and which each form a pole are spaced from each other by a narrow air gap, so that this magnetic head type is also designated as a double-gap magnetic head. Through only one of the two magnetic heads formed between the central magnet leg and a respective outer magnet leg extend the current conductors of a write and read coil winding, while the other space is filled with a nonmagnetic material. With this design of the known magnetic head, it should be possible to generate for the write function a magnetic field which has in the vicinity of the pole of the central magnet leg a narrow, strong maximum of predetermined polarity, while in the adjoining regions of the poles of the two outer magnet legs, a substantially wider but only weak maximum with opposite polarity follows. (See FIG. 4 of this European Patent application). It has been found, however, that this idealized symmetrical field pattern can hardly be achieved with this known magnetic head. The magnetic field formed between the poles of the one outer magnet leg and the central magnet leg rather is substantially smaller than the magnetic field of the poles of the central magnet leg and the other, outer magnet leg. This makes the field heavily asymmetrical and differs only slightly from the field pattern such as is generated by known thin-film magnetic heads with ring head-like shape, for instance, according to European Patent Application No. 0 012 912 A1 and is shown in FIG. 3 of European Patent Application EP 0 078 374 A1.

SUMMARY OF THE INVENTION

It is therefore an object of the present invention to improve the known thin-film magnetic head of the type mentioned above in such a manner that the symmetrical field desired thereby and caused by its magnet legs is achieved, at least to a large degree.

According to the invention, this problem is solved by the provision that the current conductors of the coil device run also through the further space, where the current flow directions in the current conductors thus arranged on both sides of the central magnet leg are opposite.

The advantages connected with the embodiment of the thin-film magnetic head according to the invention are, in particular, that magnetic field conditions can be set for the write function with the current conductors of the write/read coil device by the current conductors extending through the two interspaces, which are at least approximately symmetrical with respect to a plane extending through the pole of the central magnet leg perpendicularly to the recording medium, where a pronounced maximum is formed in the area of this symmetry plane, i.e., the magnetic head then writes advantageously the information into the recording medium as a quasi single-pole head. For the write function, the high efficiency of a ring head can be achieved because of the good magnetic flux conduction. Advantageously, the vertical component of the magnetization is strongly preferred and the level of the read signal is increased accordingly.

It is particularly advantageous if the central magnet leg comprises, at least in the vicinity of its pole, a material, the saturation magnetization of which has a higher value than, by comparison, the material or materials of the outer magnet legs, at least in the vicinity of their poles. In this way, the outer magnet legs in the area of their poles are driven, at least approximately, into magnetic saturation during the write function due to a write current flowing in the coil device, while saturation in the central magnet leg is avoided by relatively small write currents, and thereby, the maximum attainable magnetic field is reduced accordingly.

Further advantageous embodiments of the magnetic thin-film head according to the invention will be apparent from the description which follows.

BRIEF DESCRIPTION OF THE DRAWINGS

The invention will be described in greater detail in the following detailed description with reference to the drawings in which.

DETAILED DESCRIPTION

Figure 1:
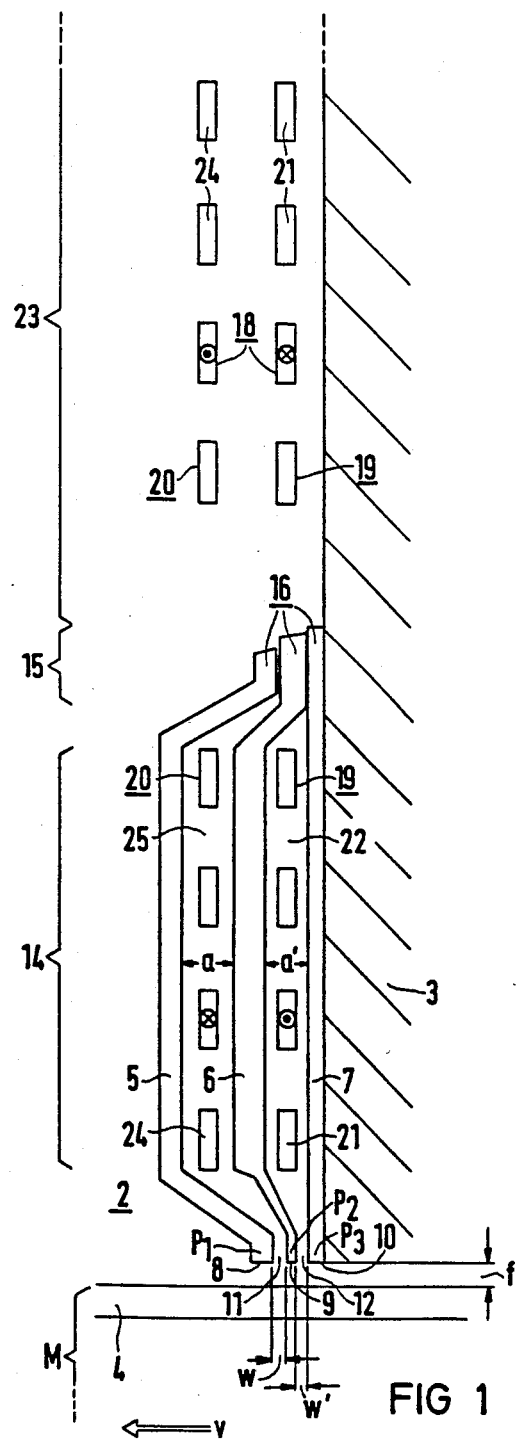
FIG. 1 shows an embodiment of a magnetic double-gap head according to the invention schematically illustrated as a longitudinal section.

With reference now to the drawings, in the thin-film magnetic head according to the invention shown in FIG. 1, three-leg embodiments known per se are taken as a start for the principle of vertical magnetization (see, for instance, the mentioned European Patent Application No. 0 078 374 A1). The head, generally designated with 2 which is to be shown, for instance, during its write function, is located on one flat side of a substrate 3 which forms, for instance, the end face or the back side of a customary element also called a flying body, and is indicated only partially in the figure. This head can be conducted relative to a recording medium M known per se, which can be magnetized vertically, at a low flying height f of, for instance, 0.2 $\mu$m over a storage layer 4 of this medium along a track. The storage layer consists, for instance, of a CoCr alloy which may optionally be placed on a magnetically soft substrate, for instance, of NiFe. The relative direction of motion of the recording medium M with respect to the magnetic head 2 is indicated in the figure by the arrow v.

The magnetic head 2 has three magnet legs 5 to 7 which are oriented largely and in particular at their ends 8 to 10 facing the recording medium M and form there respective magnet poles $P_1$, $P_2$ and $P_3$. Between these three leg ends, two air gaps 11 and 12 are formed with advantageously small longitudinal widths w and w' pointing in the direction of motion v, of less than 1 $\mu$m and, in particular, less than 0.3 $\mu$m. For instance, the widths w and w' of this double gap have approximately the same size. In a central region 14 of the magnetic head, the distances between the individual magnet legs 5 to 7 are enlarged as compared to the corresponding gap widths w and w' in that, for instance, the outer magnet leg 5 which is backward with respect to the direction of motion leads in this region, to a larger distance a relative to the central magnet leg 6. Similarly a distance a' is formed in this region 14 between the central magnet leg 6 and the inner magnet leg 7 which rests flat on the substrate 3. Outside this region, the three magnet legs 5 to 7 are brought back together in a manner known per se in a connecting region 15 on the side facing away from the recording medium M. The outer and the inner magnet leg 5 and 7 thus form a conducting body 16 carrying the magnetic flux, of ring head-like shape which in addition is equipped with a central magnet leg 6 which is surrounded by legs 5 and 7.

For the write and read function, the magnetic head 2 is provided with a coil device 18 which is formed, according to the embodiment of FIG. 1, by two single or multilayer flat coil windings 19 and 20. These coil windings, which can be fabricated, for instance, by a known planar technique, are arranged parallel at least to a large degree. The current conductors 21 of the planar coil winding 19 facing the substrate 3 extend not only through the space 22 formed between the inner magnet leg 7 and the central magnet leg 6 in the region 14, but extend also in the region 23 which follows the regions 14 and 15 on the side of the magnetic conduction body 16 facing away from the recording medium M. In a similar manner, also the current conductors 24 of the further coil winding 20 are brought through a space 25 between the central magnet leg 6 and the outer magnet leg 5. As is further indicated in the figure by symbols for the current flow directions, the current flow directions in the current conductors 21 and 24 of the two coil windings 19 and 20 are to be antiparallel, according to the invention. For this purpose the two coil windings are connected in series. In this manner a magnetic field can be generated in the vicinity of the pole $P_2$ of the central magnet leg 6 for the write function which has a pronounced maximum there, as is typical of the so-called single-pole heads.

Figure 2:
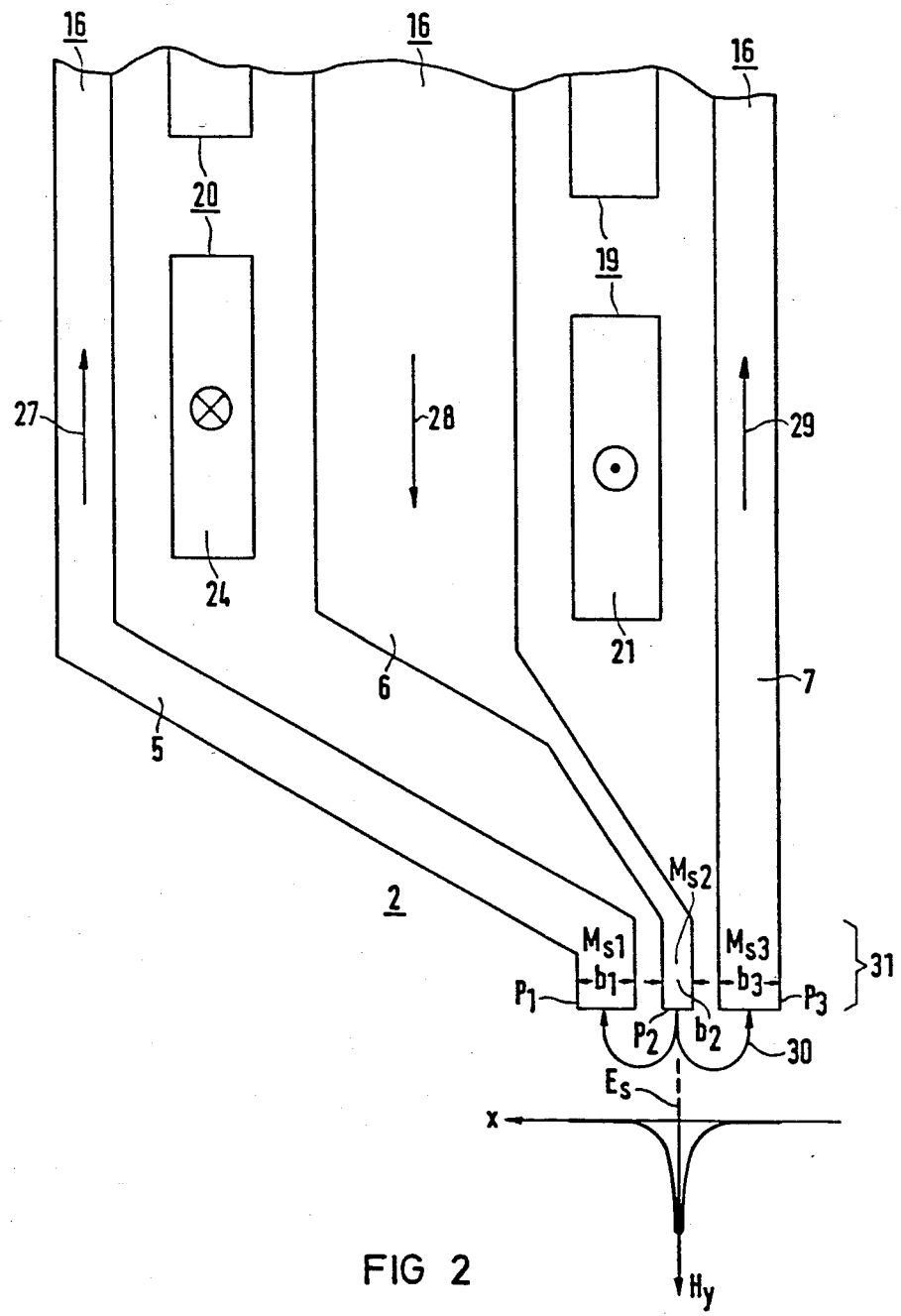
FIG. 2 shows part of the head of FIG. 1 in greater detail.

These field relationships are illustrated in greater detail in FIG. 2, in which the end of the magnetic head 2 facing the recording medium according to FIG. 1 is reproduced enlarged. In FIG. 2, the magnetizations in the individual legs 5 to 7 are illustrated by lines with arrows 27 to 29, which are obtained due to the chosen current flow directions in the current conductors 21 and 24 of the two coil windings 19 and 20. The field lines issuing at the magnet pole $P_1$ to $P_3$ are indicated by the lines designated with 30. FIG. 2 further shows in a diagram the magnetic base field $H_y$ which can be generated by the magnetic head and points in the y-direction as a function of the position plotted on an x-axis in the relative direction of motion of the magnetic head. As can further be seen in this figure directly, the width of the ourve $H_y$ which is at least largely symmetrical to a plane $E_s$, extends through the pole $P_2$ and is perpendicular to the recording medium and is therefore pointing in the y-direction, can be influenced by a suitable choice of the extent of the individual poles $P_1$ to $P_3$ in the direction of motion. Since maxima as sharp as possible, i.e., narrow maxima of the curves are desired which lead to correspondingly distinct write signals, the longitudinal width $b_2$ of the pole $P_2$ is chosen advantageously in a special embodiment of the head, substantially smaller and preferably at most half as large as any of the corresponding widths $b_1$ and $b_3$ of the adjacent poles $P_1$ and $P_3$ of opposite polarity. For reasons of symmetry, the widths $b_1$ and $b_3$ should in general be chosen approximately equally large.

It is furthermore particularly advantageous if the magnetic conduction body 16 of the magnetic head 2 is built-up from at least two different magnetic materials which have a relative permeability $\mu_r$ as large as possible, for instance, at least 1500, and preferably at least 2000 and have in addition different saturation magnetizations $M_{s1}$ to $M_{s3}$. The saturation magnetization $M_{s2}$ of the central magnet leg 6 should have a value at least 20% and preferably at least 30% higher than the saturation magnetizations $M_{s1}$ and $M_{s3}$ of the other two magnet legs 5 and 7. Since the two outer magnet legs 5 and 7 are generally built-up from the same material, $M_{s1}$ and $M_{s3}$ are then equal. Accordingly, the central magnet leg 6 consists, for instance, of a CoZr alloy with a saturation magnetization $M_{s2}$ of about 11.2 kA/cm. The two outer magnet legs 5 and 7, on the other hand, may be made for instance, of a special permalloy alloy (NiFe alloy rich in nickel) with a saturation magnetization $M_{s1}$ and $M_{s3}$ of about 8 kA/cm. For the write function, the central magnet leg 6 is then excited by the two oppositely connected coil windings 19 and 20, where each of the two outer magnet legs 5, 7 takes only about one-half of the magnetic flux of the inner magnet leg 6. Due to the higher saturation magnetization of the CoZr material of the central leg 6, a flux density about 40% higher can be achieved than in the NiFe material of the outer magnet legs 5 and 7, and the writing field strength is advantageously increased thereby accordingly.

In addition, the outer magnet legs 5 and 7, in this special embodiment of the magnetic head of different magnetic materials, the cross-sectional areas thereof, carrying the magnetic flux or their corresponding longitudinal widths $b_1$ and $b_3$, respectively, can be reduced in the region of their poles $P_1$ and $P_3$ designated with 31 to such an extent that they are already saturated before the central magnet leg 6 goes into saturation. In this manner, the vertical writing field can further be increased to advantage.

In the special magnetic head 2 according to FIGS. 1 and 2 with materials with different saturation magnetization, it is assumed that the three magnet legs 5 to 7 consist over their entire vertical length of at least one layer of a material of predetermined saturation magnetization $M_{s1}$, $M_{s2}$ and $M_{s3}$. Optionally, however, the magnetization conditions desired for the write process can also be obtained if the predetermined materials are provided only for parts of the magnet legs such as in particular for the region 31 of the individual poles. In addition, also materials with different saturation magnetizations $M_{s1}$ and $M_{s3}$ can be chosen for the two outer magnet legs 5 and 7.

Figure 3:
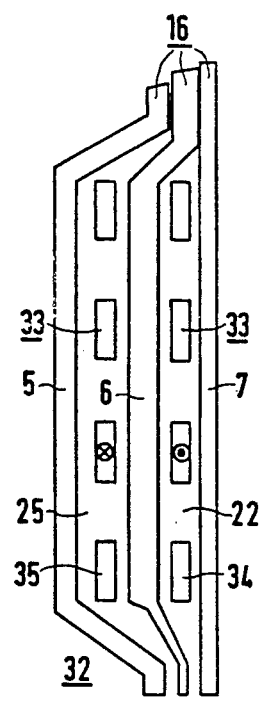
FIGS. 3 to 5 show further embodiments of magnetic heads according to the invention in corresponding views. Like parts are provided with like reference symbols in the figures.

A further thin-film magnetic head according to the invention which is shown in FIG. 3 and generally designated with 32 differs from the magnetic head 2 according to FIG. 1 substantially only by the features that its magnet coil device is not formed by two planar coil windings but that only a single coil winding 33 is wound around the central magnet leg 6 of the conduction body 16 of the magnetic head in a stacking technique known per se. According to this technique, the current conductor parts 34 and 35 of the coil winding are formed between the magnet legs 5 and 6, 6 and 7, the current oonductor parts 34 and 35 of the coil winding to be arranged there by a thin-film technique, structured and then connected to each other to form a single coil winding 33. The current flow directions in the current conductor parts 34 and 35, illustrated by the current flow direction symbols, on both sides of the central magnet leg 6, are therefore of necessity antiparallel.

Figure 4:
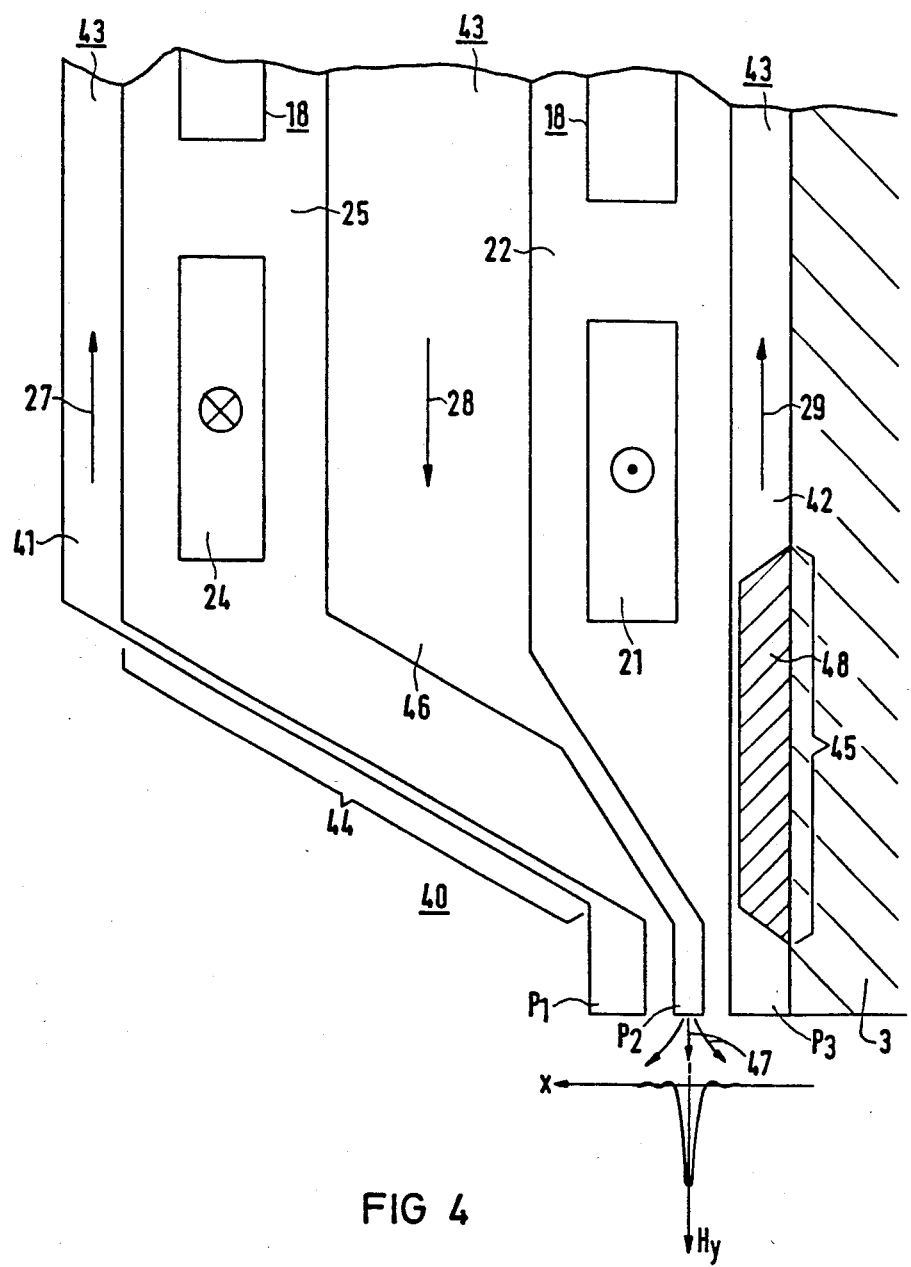

In a further embodiment of a thin-film magnetic head according to the invention, only the end portion facing the recording medium is shown in FIG. 4 corresponding to the view of FIG. 2. This magnetic head, generally designated with 40, differs from the magnetic head 2 according to FIGS. 1 and 2 substantially only by a special design of the outer magnet leg 41 and the inner magnet leg 42 of its conduction body 43 carrying the magnetic flux, since its magnet legs 41 and 42 can be driven into magnetic saturation at least in a partial section 44 and 45 with an existing, relatively large write current which is illustrated by the current flow direction symbols shown. To this end, the outer magnet leg 41 has a correspondingly small cross section of its material carrying the magnetic flux in the partial section 44 so that it then acts like a magnetic barrier for the magnetic flux which is generated by the current conductors 21 and 24, or 34 and 35 of a magnetic coil device 18 or 33 located on both sides of the central magnet leg 46. In a similar manner, a small cross section of its material carrying the magnetic flux is also provided for the inner magnet leg 42 in a partial section 45. At the pole ends $P_1$ and $P_3$ of these two magnet legs 41 and 42, at most a minimum magnetic flux is consequently still provided, so that the write function is executed practically only by the magnetic flux at the pole $P_2$ of the central magnet leg 46. The field lines issuing at the pole $P_2$ are designated with 47 in FIG. 4. The magnetic head 40 according to the invention therefore writes advantageously like a single-pole head. The vertical magnetic base field $H_y$ produced thereby which is shown in FIG. 4 in diagram form as a function of the position in the direction of motion of the head plotted on an x-axis then has a pronounced very narrow maximum, by which correspondingly distinct write singals can be generated.

According to the embodiment of the magnetic head 40 shown in FIG. 4, it was assumed that the partial section 45 of the inner magnet leg 42 is provided with a reduced cross section by the fact that in this leg, a corresponding recess 48 of nonmagnetic material is provided on the side facing the substrate 3. This recess can be developed, for instance, by an appropriate structuring of the substrate 3. It goes without saying that a corresponding recess can be provided also on the opposite side, i.e., on the side of the interspace 22 formed between the inner magnet leg 42 and the central magnet leg 46. In addition, the partial sections 44 and 45 of reduced cross section of the two magnet legs 41 and 42 may not have only the relatively short distance assumed in FIG. 4 in the direction of the flux return, but the partial sections can each extend over the major part of the corresponding magnet leg.

In addition, the maximum dimension, illustrated in FIG. 4, of the poles $P_1$ and $P_3$ in the direction of motion relative to the central pole $P_2$ is not absolutely required in the embodiments of a double-gap magnetic head with reduced-cross section partial sections which can be driven into magnetic saturation by a write current. Thus, these poles can also be included, for instance, in the partial sections with reduced cross section, so that their longitudinal extent is then always smaller than that of the central pole $P_2$.

Figure 5:
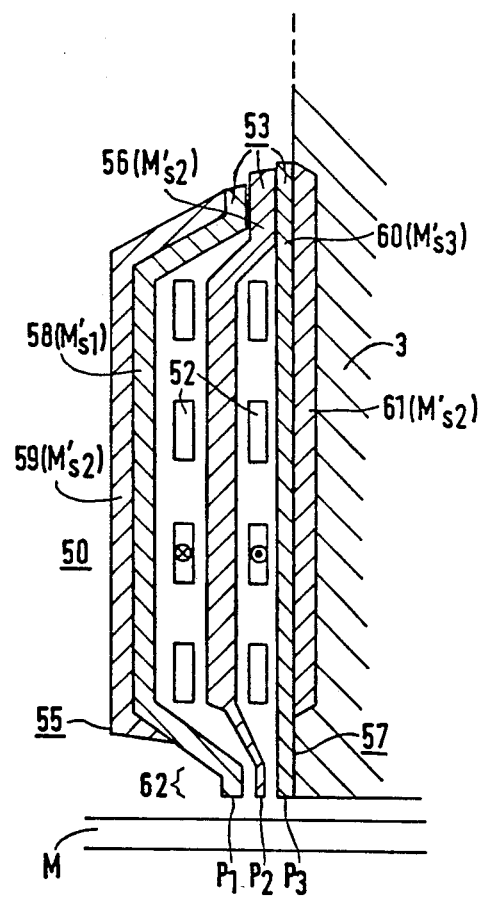

In a further embodiment of a magnetic head according to the invention, shown in FIG. 5, a write/read coil arrangement which can be fabricated by a stacking technique as in the magnetic head 32 according to FIG. 3, is taken as the base. Accordingly, in this magnetic head designated with 50, in the design of which the magnetic head 32 according to FIG. 3 is taken as the base, the single coil winding 52 is wound around the central magnet leg 56 of its magnetic conduction body 53. In addition, this magnetic head 50 differs from the magnetic head 2 and 32 according to FIGS. 1 and 3, also by the fact that its two outer magnet legs 55 and 57 each consist of at least two magnetic layers 58, 59 and 60, 61, respectively, with different values $M_s$ of their saturation magnetizations. The layers 58 and 60 of the outer legs 55 and 57 which extend up to the pole ends $P_1$ and $P_3$ have a lower $M_s$ value. These values designated with $M'_{s1}$ and $M'_{s3}$ can correspond, for instance, to the values $M_{s1}$ and $M_{s3}$ according to the specific embodiment according to FIG. 2 and may optionally be also equal. Therefore, the mentioned NiFe alloy can be chosen as the material for these layers. On the other hand, the additional magnetic layers 59 and 61 of the two outer magnet legs 55 and 57 consist of a material with a higher value $M'_{s2}$ of the saturation magnetization which do not extend into the region of the respective pole ends into the region designated with 62. Thus, the mentioned CoZr alloy with the value $M_{s2}$ according to FIG. 2, can be chosen for these additional layers. The central magnet leg 56 consists, for instance, also of this material with the saturation magnetization $M'_{s2}$. It can be achieved by this embodiment that, for the write function with a large current, the two outer poles $P_1$ and $P_3$ of the mentioned NiFe alloy are saturated quickly and the magnetic head 50 therefore operates as a single-pole head. The unsaturated outer CoZr layers 59 and 61 thereby improve the conduction of the magnetic flux and thereby the write sensitivity. This desired function is available also if, according to FIG. 5, the layers 59 and 61 with the higher saturation magnetization $M'_{s2}$ are not arranged on the respective outer side of the layers 58 and 60 with the smaller saturation magnetization $M'_{s1}$ and $M'_{s3}$, but on the inside thereof.

Besides the mentioned CoZr material for the layers having a high saturation magnetization according to the embodiments shown in FIGS. 2 and 5, also other materials such as FeB or FeSiRu can be provided.

The magnetic heads according to the invention are advantageously fabricated by a thin-layer or thin-film technique known per se. The substrates used consist, for instance, of TiC and $Al_2O_3$. For building up the magnet legs, thin magnetic layers of special NiFe alloys such as permalloy (Ni/Fe-81/19) or magnetically soft amorphous materials, for instance, of FeB are applied by sputtering, vapor deposition or electroplating and are separated from each other by a nonmagnetic intermediate layer. The easy direction of magnetization can be induced, for instance, during the application of the respective layer by an applied magnetic field. In general, it is always perpendicular to the direction of the magnetic flux in the magnetic conduction body, i.e., in the vicinity of the magnet poles $P_1$ to $P_3$ substantially parallel to the surface of the recording medium M. The grown different layers are structured by techniques known per se such as photolithography, plasma-, ion beam- or wet-chemical etching in order to design the magnet legs of the head in this manner. For fabricating the magnet coil arrangement provided for the magnet coil device for the write and read function, a layer several $\mu m$ thick of Cu or Al or Au is deposited and structured accordingly. The individual insulating layers required for building up the magnetic heads are omitted in the figures for reasons of clarity.

In the foregoing specification, the invention has been described with referenee to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A thin-film magnetic head produced by a stratified build-up on a nonmagnetic substrate for a recording medium having a magnetizable storage layer into which information can bve written along a track by vertical magnetization, the magnetic head comprising:

a magnetic conduction body for carrying magnetic flux, the body having two outer magnet legs and a further cental magnet leg, each magnet leg having a pole facing the recording medium and being arranged one behind the other as viewed in the direction of relative motion of the head and medium and having predetermined gap widths between adjacent poles, said magnet legs being shaped so as to form enlarged spaces between each other at a location spaced away from the poles;

a write/read coil arrangement having current conductors extending through one of the spaces formed between the central magnet leg and one of the outer magnet legs adjacent thereto, the current conductors of the coil arrangement further extending through the other space between the central magnet leg and the other of the outer magnet legs, the current flow directions in the current conductors arranged on both sides of the central magnet leg being opposed to each other so that during writing into said recording medium, a magnetic writing field is generated which is substantially symmetrical with respect to a plane extending vertically to the recording medium through the pole of the central magnet leg.

2. The magnetic head recited in claim 1, wherein the magnetic conduction body comprises at least partially a magnetically soft material.

3. The magnetic head recited in claim 1, wherein the magnetic conduction body comprises a material, the easy magnetization of which is aligned at least largely perpendicularly to the conduction direction of the magnetic flux.

4. The magnetic head recited in claim 1, wherein the magnetic conduction body comprises a material, the relative permeability of which is at least 1500 and preferably at least 2000.

5. The magnetic head recited in claim 1, wherein the poles of the magnet legs adjacent to the central magnet leg have a substantially larger dimension in the direction of motion of the magnetic head than the magnetic pole of the central magnet leg.

6. The magnetic head recited in claim 1, wherein the coil arrangement is formed by at least largely planar coil windings.

7. The magnetic head recited in claim 1, wherein the coil arrangement comprises a coil winding disposed around the central magnet leg.

8. The magnetic head recited in claim 1, wherein the two magnet legs adjacent to the central magnet leg each have a predetermined small cross section in a partial section, so that these partial sections are driven, at least largely, into magnetic saturation by a write current of the coil arrangement.

9. The magnetic head recited in claim 8, wherein the partial sections with predetermined small cross section of the two magnet legs adjacent to the central magnet leg also include the magnet poles of these magnet legs.

10. The magnetic head recited in claim 1, wherein the central magnet leg comprises, at least in the region of its pole, a material having a saturation magnetization which has a higher value than a saturation magnetization of the material of the outer magnet legs at least in the region of their poles, so that the outer magnet legs are driven by a write current flowing in the coil arrangement substantially into magnetic saturation sooner than the central magnet leg.

11. The magnetic head recited in claim 10, wherein the saturation magnetization of the central magnet leg at least in the region of its pole, is at least 20% and preferably at least 30% higher than the saturation magnetization of the outer magnet legs at least in the region of their poles.

12. The magnetic head recited in claim 10, wherein, for the parts of the magnetic conduction body of the material with the comparatively lower saturation magnetization, a material with a saturation magnetization of less than 8 kA/cm and preferably less than 5 kA/cm is provided.

13. The magnetic head recited in claim 10, wherein, for the parts of the magnetic conduction body comprising the material with the relatively higher saturation magnetization, a material with a saturation magnetization of at least 10 kA/cm and preferably more than 11 kA/cm is provided.

14. The magnetic head recited in claim 10, wherein the material with the lower saturation magnetization comprises a permalloy alloy.

15. The magnetic head recited in claim 10, wherein the material with the higher saturation magnetization consists of one of an CoZr alloy, an FeB alloy and an FeSiRu alloy.

16. The magnetic head recited in claim 10, wherein at least one of the two outer magnet legs comprises a first magnetic layer having relatively low saturation magnetization and further has outside of the region of its pole at least one further magnetic layer, the saturation magnetization of which is higher than the lower saturation magnetization of the first magnetic layer of the leg.

17. The magnetic head recited in claim 16, wherein the further magnetic layer has a saturation magnetization which is at least 20% and preferably at least 30% higher than the saturation magnetization of the first magnetic layer.

* * * * *